United States Patent
Frank

(10) Patent No.: US 8,602,505 B2
(45) Date of Patent: *Dec. 10, 2013

(54) ARCHITECTURE FOR AN ELECTROMECHANICAL BRAKING SYSTEM

(75) Inventor: David Frank, Paris (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 258 days.

This patent is subject to a terminal disclaimer.

(21) Appl. No.: 12/914,492

(22) Filed: Oct. 28, 2010

(65) Prior Publication Data

US 2011/0100769 A1 May 5, 2011

(30) Foreign Application Priority Data

Oct. 30, 2009 (FR) ...................................... 09 05215

(51) Int. Cl.
  *B60T 13/74* (2006.01)
(52) U.S. Cl.
  USPC .......................................... 303/20; 188/106 P
(58) Field of Classification Search
  USPC ................ 303/9.62, 20, 122, 122.04, 122.05, 303/122.08, 122.09; 188/106 P, 188 R; 244/111, 110 R, 110 A, 110 H
  See application file for complete search history.

(56) References Cited

U.S. PATENT DOCUMENTS

| | | | |
|---|---|---|---|
| 6,296,325 B1 * | 10/2001 | Corio et al. ...................... 303/20 |
| 8,201,895 B2 * | 6/2012 | Frank .............................. 303/20 |
| 2005/0110339 A1 * | 5/2005 | Kolberg .......................... 303/20 |
| 2005/0189814 A1 | 9/2005 | Mallevais et al. |
| 2005/0192733 A1 * | 9/2005 | Dellac et al. .................... 701/70 |
| 2008/0258547 A1 | 10/2008 | Ralea et al. |
| 2008/0258548 A1 * | 10/2008 | May et al. ..................... 244/111 |
| 2009/0278401 A1 * | 11/2009 | Summers et al. ............... 303/20 |
| 2012/0065816 A1 * | 3/2012 | Cahill ......................... 188/106 P |

FOREIGN PATENT DOCUMENTS

EP   1 547 918 A1   6/2005

* cited by examiner

*Primary Examiner* — Thomas J Williams
(74) *Attorney, Agent, or Firm* — Sughrue Mion, PLLC

(57) ABSTRACT

The invention relates to an architecture for powering aircraft brakes for an aircraft having at least two undercarriages, each having a certain number of wheels, each of the wheels being fitted with brakes, each having a certain number of electromechanical braking actuators, the architecture including controllers for delivering power signals to the actuators in response to a braking order, the wheels on each of the undercarriages being grouped together in first and second complementary groups such that for each group of wheels, a first group of actuators is controlled by one controller that controls those actuators only, and a complementary second group of actuators is controlled by another controller that controls only those actuators.

4 Claims, 1 Drawing Sheet

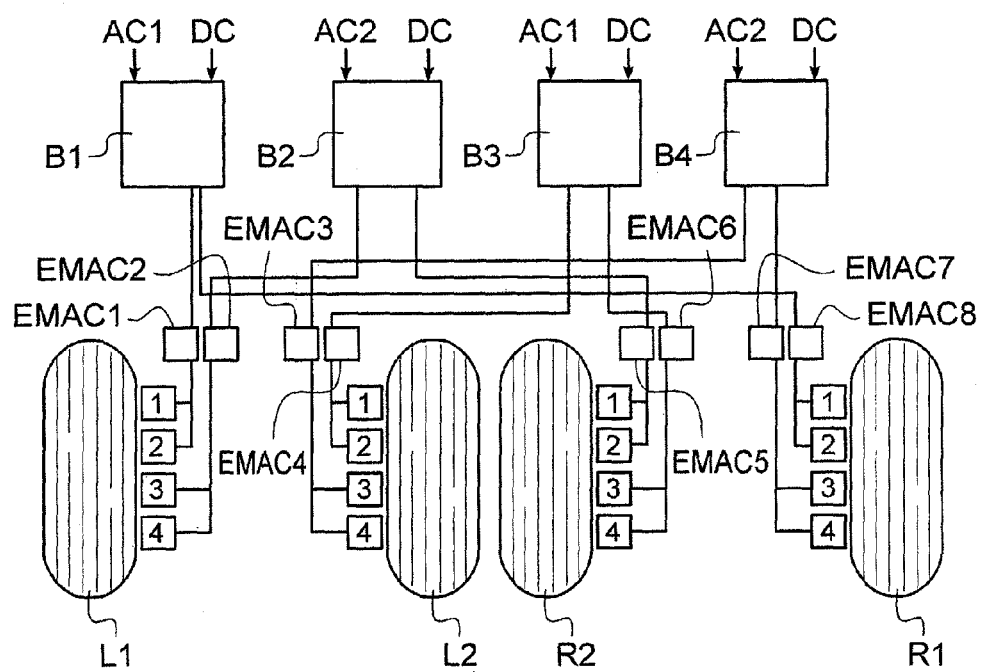

ARCHITECTURE FOR AN ELECTROMECHANICAL BRAKING SYSTEM

The invention relates to an architecture for an electromechanical braking system.

TECHNOLOGICAL BACKGROUND OF THE INVENTION

Braking system architectures are known, in particular from document U.S. Pat. No. 6,296,325, that include a plurality of brake controllers (known as electromechanical actuator controllers or EMACs) that are arranged in pairs to provide calibrated power signals to the electromechanical braking actuators of two wheels. One of the EMACs supplies calibrated power signals to one group of actuators of one wheel and also to one group of actuators of an adjacent wheel, the other EMAC providing calibrated power signals to the remaining actuators for both wheels, both EMACs being connected to distinct power supplies so that the loss of one of the EMACs or of one of the power supplies causes only some of the actuators on each wheel to be lost, the remaining actuators continuing to be controlled by the other EMAC.

In that document, the EMACs are said to be "redundant" even though the actuators are each connected to a single EMAC, such that an EMAC failure necessarily condemns the actuators connected to the failed EMAC. No other EMAC takes over control of those actuators in the event of the corresponding EMAC failing. Properly speaking, the EMACs are therefore not redundant. Nevertheless, each of them is arranged to increase the force exerted by the actuators connected to the working EMAC in the event of the associated EMAC failing, thereby at least partially compensating for the loss of the failed EMAC and the associated actuators.

Nevertheless, with such an architecture, the loss of any one EMAC is critical and prevents the aircraft departing since the loss of that EMAC leads to the loss of the associated actuators carried by one of the undercarriages, and the subsequent failure of the EMAC paired therewith and powering the other actuators carried by the same undercarriage would lead to a total loss of braking on all of the actuators of that undercarriage, which is not acceptable.

FIG. 10 of document U.S. Pat. No. 6,402,259 proposes an architecture with EMACs that are genuinely redundant, that are associated in pairs so that both of them control the actuators of an undercarriage, such that even if one EMAC fails, the associated EMAC can control all of the actuators controlled by the failed EMAC.

However, once more, the loss of one EMAC is critical and prevents departure of the aircraft, since any subsequent failure of the EMAC paired therewith would lead to a total loss of braking on all of the actuators carried by one of the undercarriages, which is likewise not acceptable.

OBJECT OF THE INVENTION

The invention seeks to improve existing braking architectures in order to reduce the consequences of losing an EMAC.

BRIEF DESCRIPTION OF THE INVENTION

To achieve this object, the invention provides an architecture for powering aircraft brakes for an aircraft having at least two undercarriages, each having a certain number of wheels, each of the wheels being fitted with brakes, each having a certain number of electromechanical braking actuators, the architecture including controllers (EMACs) for delivering power signals to the actuators in response to a braking order, the wheels on each of the undercarriages being grouped together in first and second complementary groups such that for each group of wheels, a first group of actuators is controlled by one controller that controls those actuators only, and a complementary second group of actuators is controlled by another controller that controls only those actuators.

Thus, the loss of one EMAC affects no more than the actuators controlled by that EMAC, which can still be powered by the second EMAC. In the event of the second EMAC failing, the corresponding actuators are completely lost. Thus at worst, two EMAC failures leads to the loss of braking on one of the groups of wheels, but not on all of the wheels of the undercarriage as in prior art architectures. Here, the EMACs are not redundant, and the loss of one EMAC is preferably compensated by the EMAC paired therewith being programmed to increase the braking force of the group of actuators that it controls.

BRIEF DESCRIPTION OF THE FIGURE

The invention can be better understood in the light of the following description of the sole FIGURE, which shows a breaking architecture in a particular embodiment of the invention.

DETAILED DESCRIPTION OF THE INVENTION

The invention is described below with reference to an aircraft of the A320 or B737 type, or any airplane having four braked wheels, with two main undercarriages each carrying two braked wheels, respectively referenced L1 and L2 for the wheels carried by the left main undercarriage and R1 and R2 for the wheels carried by the right main undercarriage. It is clear that the invention is not limited to this particular type of aircraft, and the way in which the invention can be applied to other types of aircraft is specified at the end of the description.

Each of the wheels is fitted with an electromechanical brake, here comprising four actuators per brake (respectively numbered 1, 2, 3, and 4 for each of the wheels).

In this embodiment, the architecture has four power supply units respectively referenced B1, B2, B3, and B4, that are arranged to receive electrical power from one of the power buses of the aircraft. Specifically, the power supply units B1 and B3 receive power from a first power supply bus AC1 (typically supplying alternating current (AC) at 115 volts (V)), and the power supply units B2 and B4 receive power from a second power supply bus AC2 (having the same characteristics), independent of the first power supply bus.

In addition, the four power supply units are connected to a direct current (DC) voltage source (the batteries of the aircraft typically supply 28 V DC).

The power supply units essentially comprise AC/DC converters for converting alternating current from the power supplies into direct current (typically 270 V DC), and a DC/DC converter for converting direct current from the battery into DC power current. The power supply units also contain controlled switches for switching between power sources.

As explained in greater detail below, the provision in accordance with the invention of a plurality of power supply units (unlike the arrangement shown in FIG. 10 of document U.S. Pat. No. 6,402,259 in which only one power supply unit or "power converter" is provided) makes it possible to improve the availability of the architecture of the invention.

Each of the power supply units B1 . . . B4 is connected to two controllers referred to below as EMACs, selected from the eight available controllers. The EMACs serve to calibrate the power delivered by the power supply units to deliver a three-phase power signal to the actuators in response to a braking signal generated by a braking computer. To do this, the EMACs comprise controlled calibration means in the form of an inverter with control electronics for the associated actuator motors.

The arrangement of converter means in power supply units that are separate from the EMACs proper containing the controlled calibration means presents several advantages. It is advantageous to be able to place the batteries adjacent to the power supply units since converting 28 V DC into 270 V DC at a power of several kilowatts leads to very high amperage and thus to a cable of large section between the battery and the converter means, thereby making it appropriate to limit the length of that cable. The power supply units are therefore preferably located in the vicinity of the batteries, which are usually located at the front of the aircraft. Furthermore, it is advantageous to place the calibration means as close as possible to the actuators in order to minimize cable lengths (three cables per motor and at least four cables for the associated angular position sensor) conveying power to the actuators and current along the undercarriage. Arranging these two means in two separate units thus enables both of these objectives to be satisfied.

The EMACs are respectively numbered 1 to 8 and each EMAC controls only two actuators of a given brake (or of a given wheel, which amounts to the same thing), and in this example the arrangement is as follows:

EMAC 1 controls actuators 1 and 2 of the wheel L1 carried by the left main undercarriage;

EMAC 2 controls actuators 3 and 4 of the wheel L1 carried by the left main undercarriage;

EMAC 3 controls actuators 1 and 2 of the wheel L2 carried by the left main undercarriage;

EMAC 4 controls actuators 3 and 4 of the wheel L2 carried by the left main undercarriage;

EMAC 5 controls actuators 1 and 2 of the wheel R2 carried by the right main undercarriage;

EMAC 6 controls actuators 3 and 4 of the wheel R2 carried by the right main undercarriage;

EMAC 7 controls actuators 1 and 2 of the wheel R1 carried by the right main undercarriage; and EMAC 8 controls actuators 3 and 4 of the wheel R1 carried by the right main undercarriage.

Thus, and unlike prior art architectures, the EMACs here control only a portion of the actuators of only one wheel. The EMACs are therefore not redundant in the usual meaning of the term.

The power supply units power the brake actuators in the following arrangement:

unit B1 powers EMAC 1 and EMAC 8;
unit B2 powers EMAC 2 and EMAC 5;
unit B3 powers EMAC 4 and EMAC 6; and
unit B4 powers EMAC 3 and EMAC 7.

This disposition presents the advantages set out in the table below that shows the incidence of a failure in any one of the power supply units on the braking capacity of the aircraft:

| Failed unit | B1 | B2 | B3 | B4 |
|---|---|---|---|---|
| Working actuators on L1 | 3, 4 | 1, 2 | 1, 2, 3, 4 | 1, 2, 3, 4 |
| Working actuators on L2 | 1, 2, 3, 4 | 1, 2, 3, 4 | 3, 4 | 1, 2 |
| Working actuators on R2 | 1, 2, 3, 4 | 3, 4 | 1, 2 | 1, 2, 3, 4 |
| Working actuators on R1 | 3, 4 | 1, 2, 3, 4 | 1, 2, 3, 4 | 1, 2 |

It can thus be seen that a failure of any one of the power supply units causes two actuators to be lost on one of the wheels on one of the undercarriages and two actuators on one of the wheels of the other undercarriage, such that on each undercarriage six braking actuators remain powered. It thus remains possible to perform braking that is completely symmetrical.

It is easy to compensate a failure at least in part by calling on the actuators that continue to be powered to deliver additional braking force.

There follows an examination of the consequences of an additional failure of one of the units. In the tables below, it is examined in succession which actuators remain powered in the event of one of the units failing (specified at the head of the table), followed by another unit failing.

| Unit B1 failed | B2 | B3 | B4 |
|---|---|---|---|
| Working actuators on L1 | — | 3, 4 | 3, 4 |
| Working actuators on L2 | 1, 2, 3, 4 | 3, 4 | 1, 2 |
| Working actuators on R2 | 3, 4 | 1, 2 | 1, 2, 3, 4 |
| Working actuators on R1 | 3, 4 | 3, 4 | — |

| Unit B2 failed | B1 | B3 | B4 |
|---|---|---|---|
| Working actuators on L1 | — | 1, 2 | 1, 2 |
| Working actuators on L2 | 1, 2, 3, 4 | 3, 4 | 1, 2 |
| Working actuators on R2 | 3, 4 | — | 3, 4 |
| Working actuators on R1 | 1, 2, 3, 4 | 1, 2, 3, 4 | 1, 2 |

| Unit B3 failed | B1 | B2 | B4 |
|---|---|---|---|
| Working actuators on L1 | 3, 4 | 1, 2 | 1, 2, 3, 4 |
| Working actuators on L2 | 3, 4 | 3, 4 | — |
| Working actuators on R2 | 1, 2 | — | 1, 2 |
| Working actuators on R1 | 3, 4 | 1, 2, 3, 4 | 1, 2 |

| Unit B4 failed | B1 | B2 | B3 |
|---|---|---|---|
| Working actuators on L1 | 3, 4 | 1, 2 | 1, 2, 3, 4 |
| Working actuators on L2 | 1, 2 | 1, 2 | — |
| Working actuators on R2 | 1, 2, 3, 4 | 3, 4 | 1, 2 |
| Working actuators on R1 | — | 1, 2 | 1, 2 |

Thus, it can be seen that losing two power supply units always leads four actuators that can be powered on each of the undercarriages. Depending on circumstances, that may be two actuators per wheel or four actuators on one of the wheels, the other wheel then no longer having any powered actuators.

Nevertheless, symmetrical braking continues to remain possible. As with a single failure, it remains possible at least in part to compensate for the loss of the non-powered actuators by calling on those actuators that continue to be powered to deliver additional braking force. This is naturally valid only if the extra amounts of force to be applied do not exceed the levels of braking that are at the grip limit of the runway. Under such circumstances, braking becomes slightly asymmetrical, which might require a small amount of compensation by means of the rudder or by steering the nosegear.

In addition, the loss of one of the power supply buses AC1 or AC2 limits the power available for powering the units concerned (respectively B1, B3 or B2, B4) to the power that is available from the DC power supply. Nevertheless, it does not cause the actuators connected to the power supply units concerned to lose all capacity for braking. In particular, if the aircraft batteries are dimensioned so as to be capable of delivering at least 50% of the nominal braking force, then the loss of one of the power supply buses after a departure of the aircraft in a limp-home condition (e.g. with one of the EMACs failed or with one of the power supply units failed) does not have any impact on the critical braking distance, since it is always possible to brake with 25% of the nominal force on the wheels concerned, which represents substantially the force that can be developed on a wet runway, i.e. the force that defines the critical distance.

It should be observed that each of the power supply units has two distinct outlets, one for each EMAC. Thus, the loss of an electrical connection between a unit and an EMAC leads to the loss of only two actuators, and not all four actuators powered by the unit.

Finally, the loss of one of the EMACs leads to no more than losing two of the actuators, the loss of a second EMAC leading to the loss of four actuators, which under the worst circumstances would lead to total loss of braking on one wheel.

Preferably, each actuator is dimensioned so as to be capable, at least occasionally, of developing a braking force equivalent to that developed by two actuators of a brake in which all of the actuators are being powered during braking at a level that brings the corresponding wheel up to the wheel-lock limit while landing on a dry runway.

For such braking, the maximum force developed by an actuator of a brake having all of its actuators powered is of the order of 66% of the nominal force (which by definition is the braking force that needs to be generated by an actuator during an aborted takeoff at maximum weight). It is therefore appropriate to dimension the actuators so that they can occasionally deliver a force that is equal to 132% of the nominal force.

Thus, with only two out of four actuators, it is possible on the wheel concerned to develop a braking force that is equal to 132/2=66% of the nominal braking force, which corresponds to the force developed by a brake having all of its actuators powered prior to wheel lock occurring when landing on a dry runway.

The invention is not limited to the above description, but on the contrary covers any variant coming within the ambit defined by the claims.

In particular, although in the example shown the wheels are fitted with brakes that have an even number of actuators, with the actuators being arranged in a first group of actuators (actuators 1, 2) that are powered by one of the units and a complementary second group of actuators (actuators 3, 4) that are powered by another unit, with the groups having equal numbers of actuators, it is possible more generally to distribute the actuators in two groups even if the number of actuators is odd. Under such circumstances, it is advantageous for each wheel to define two groups of actuators that differ by no more than one actuator.

Although the invention is described with reference to an aircraft having two main undercarriages each having two braked wheels, the invention can be generalized immediately to an aircraft having two main undercarriages each carrying more than two braked wheels, e.g. four or six. It suffices to define for each of the undercarriages two groups of wheels (e.g. each group of wheels comprises the wheels carried on a given side of the undercarriage). For each of the groups of wheels (and thus of brakes) as defined in this way, a first group of actuators is powered by one of the units and a complementary second group is powered by another unit in the arrangement of the invention. The invention also generalizes to aircraft having more than two main undercarriages. For example, if the aircraft has two main wing undercarriages and a central main undercarriage all having braked wheels (as applies to A340-600), it suffices to allocate the wheels carried by the central main undercarriage to one or the other of the groups of wheels formed by the wheels of the wing main undercarriages.

By extension, and to use common vocabulary in the claims, the term "group of wheels" is used even when, as in the example described, the group has only one wheel.

What is claimed is:

1. An architecture for powering aircraft brakes for an aircraft having at least two undercarriages, each undercarriage having a plurality of wheels, the architecture comprising:
   a brake fitted to each of said wheels, each brake having a plurality of electromechanical braking actuators;
   a plurality of controllers, each controller being configured for delivering power signals to a respective one or more of the actuators in response to a braking order,
   wherein, the plurality of wheels on each of the at least two undercarriages being grouped together in first and second complementary groups, and
   wherein, for each wheel in said first and second complementary groups of wheels, a first group of actuators is controlled by one controller that controls those actuators only, and a complementary second group of actuators is controlled by another controller that controls only those actuators.

2. An architecture according to claim 1, wherein the two controllers controlling the actuators of a given group of wheels are powered by distinct power supplies.

3. An architecture according to claim 2, having power supply units for powering the controllers from power supplies of the aircraft, each of the power supply units powering two controllers.

4. An architecture according to claim 3, wherein the power supply units include first, second, third and fourth power supply units that power the controllers as follows:
   the first power supply unit powers the controller that controls one group of actuators of the first group of wheels of the first undercarriage, and the controller that controls one group of actuators of the first group of wheels of the second undercarriage;
   the second power supply unit powers the controller that controls a complementary group of actuators of the first group of wheels of the first undercarriage, and the controller that controls a group of actuators of the second group of wheels of the second undercarriage;
   the third power supply unit powers the controller that controls a group of actuators of the second group of wheels of the first undercarriage, and the controller that controls a complementary group of actuators of the first group of wheels of the second undercarriage; and
   the fourth power supply unit powers the controller that controls a complementary group of actuators of the second group of wheels of the first undercarriage, and the controller that controls a complementary group of actuators of the first group of wheels of the second undercarriage.

* * * * *